US008406287B2

(12) United States Patent
Sato et al.

(10) Patent No.: US 8,406,287 B2
(45) Date of Patent: Mar. 26, 2013

(54) ENCODING DEVICE, ENCODING METHOD, AND PROGRAM

(75) Inventors: Kazushi Sato, Kanagawa (JP); Junichi Tanaka, Kanagawa (JP); Ohji Nakagami, Tokyo (JP); Yiwen Zhu, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1273 days.

(21) Appl. No.: 12/162,616

(22) PCT Filed: Feb. 7, 2007

(86) PCT No.: PCT/JP2007/052130
§ 371 (c)(1),
(2), (4) Date: Jul. 30, 2008

(87) PCT Pub. No.: WO2007/091601
PCT Pub. Date: Aug. 16, 2007

(65) Prior Publication Data
US 2009/0046092 A1 Feb. 19, 2009

(30) Foreign Application Priority Data

Feb. 8, 2006 (JP) ................................. 2006-031220

(51) Int. Cl.
*H04N 7/12* (2006.01)
*H04N 11/02* (2006.01)
*H04N 11/04* (2006.01)
*G06K 9/40* (2006.01)
(52) U.S. Cl. ......... 375/240.01; 375/240.03; 375/240.04; 375/240.12; 375/240.13; 375/240.26; 382/275
(58) Field of Classification Search . 375/240.01–240.29
See application file for complete search history.

(56) References Cited

U.S. PATENT DOCUMENTS

| 6,507,615 | B1* | 1/2003 | Tsujii et al. | 375/240.04 |
| 6,658,157 | B1* | 12/2003 | Satoh et al. | 382/239 |
| 7,023,924 | B1* | 4/2006 | Keller et al. | 375/240.26 |
| 2003/0053540 | A1* | 3/2003 | Wang et al. | 375/240.12 |

(Continued)

FOREIGN PATENT DOCUMENTS

| JP | 7 50839 | 2/1995 |
| JP | 10 191355 | 7/1998 |

(Continued)

OTHER PUBLICATIONS

Keiichi Chono et al., Detented Quantization to Suppress Flicker Artifacts in Periodically Inserted Intra-Coded Pictures in H.264 Video Coding, 2006, IEE ICIP, pp. 1713-1716.*

(Continued)

*Primary Examiner* — Christopher S Kelley
*Assistant Examiner* — Hee-Yong Kim
(74) *Attorney, Agent, or Firm* — Oblon, Spivak, McClelland, Maier & Neustadt, L.L.P.

(57) ABSTRACT

A coding device having a judgment unit configured to judge whether or not a GOP is a GOP where GOP unit flicker is readily visible in an image decoded after encoded the GOP, for each of GOPs forming image data to be coded, and a coding unit configured to apply processing for suppressing the GOP unit flicker when the judgment unit judges that the GOP is a GOP where flicker is readily visible.

17 Claims, 10 Drawing Sheets

U.S. PATENT DOCUMENTS

| | | | |
|---|---|---|---|
| 2004/0202248 A1* | 10/2004 | Boroczky et al. | 375/240.12 |
| 2005/0169371 A1* | 8/2005 | Lee et al. | 375/240.03 |
| 2007/0110332 A1* | 5/2007 | Asano et al. | 382/275 |
| 2008/0025397 A1* | 1/2008 | Zhao et al. | 375/240.13 |
| 2008/0101465 A1* | 5/2008 | Chono et al. | 375/240.03 |

FOREIGN PATENT DOCUMENTS

| | | |
|---|---|---|
| JP | 10 304375 | 11/1998 |
| JP | 2002-010263 | 1/2002 |
| JP | 2004 15351 | 1/2004 |
| JP | 2004 56234 | 2/2004 |

OTHER PUBLICATIONS

Seong Soo Chun et al., Intra Prediction Mode Selection for Flicker Reduction in H.264/AVC, 2006, IEEE Transactions on Consumer Electronics, vol. 52 No. 4, pp. 1303-1310.*

Naohiro Hara et al., Flicker Reduction in MPEG-2 Video by Post-Processing, 2005, IEEE Transactions on Consumer Electronics, vol. 51 No. 1, pp. 210-217.*

European Search Report issued Aug. 2, 2012 in European Application No. 07708169.3.

A. Becker et al., "Flicker Reduction in Intraframe Codecs," Computer Society, Proceedings of the Data Compression Conference, IEEE (2004).

Shu Tanabe et al., "On Flicker Artifacts of Motion JPEG 2000," Coding of Still Pictures, ISO/IEC JTC 1/SC 29/WG 1 (Feb. 20, 2002).

Eric Barrau, "A Scalable MPEG-2 Bit-Rate Transcoder with Graceful Degradation," Video and Communications Group, Laboratoires d'Electronique Philips, IEEEE, pp. 78-79 (2001).

Xiaopeng Fan et al., "Flicking Reduction in all Intra Frame Coding," Joint Video Team of ISL/IEC MPEG & ITU-T VCEG, Institute of Computing Technology (Oct. 2002).

* cited by examiner

NOT USE PICTURES BEFORE THIS FOR PREDICTION

ENCODING DEVICE, ENCODING METHOD, AND PROGRAM

TECHNICAL FIELD

The present invention relates to a coding device, a coding method, and a program, for encoding image data.

BACKGROUND ART

In recent years, there is developed a device based on the H.264/AVC (Advanced Video Coding) scheme, in which image data is handled as digital data, at that time, for the purpose of transmitting and storing information with a high efficiency, the data is compressed by a discrete cosine transform or other orthogonal transform and motion compensation, by using the redundancy peculiar to image information.

In the MPEG (Moving Picture Experts Group) 2, the number of reference frames is two, and the number of the past reference picture located before the present picture is always one.

Contrary to this, in the H.264/AVC, it is permitted to have a plurality of reference frames, at the same time, for example, as shown in FIG. 10(A), it is also possible to refer to further past pictures over an I picture.

Accordingly, even when starting decoding from the I picture, it is not guaranteed that the decoding can be correctly carried out. This becomes a big problem in a random access etc. Therefore, in the H.264/AVC, a picture called as an IDR (Instantaneous Decoder Refresh) picture as shown in FIG. 10(B) is prescribed. With H.264/AVC, when decoding an IDR picture, all information stored in the memory which are required for the decoding such as the reference frames, frame numbers, and POC (Picture Order Count: information indicating an output order of pictures) are reset. Accordingly, it is prohibited to refer to further past pictures exceeding the IDR picture. Further, with an IDR picture, a reference frame memory, a buffer, etc. are initialized. When the decoding is started from an IDR picture, correct decoding of the image is guaranteed.

DISCLOSURE OF INVENTION

Technical Problem

In a case, for example, where a sequence almost completely includes still images having a little motion, or in a case where there is a region having little motion in a part of a sequence, a texture of the image or the region is encoded with reference to the I pictures, and the P and B pictures are skipped. Due to this, a good decoded image is obtained with a small coding amount.

However, in a case where an IDR picture as shown in FIG. 10(B) is inserted at a constant interval, it suffers from the problem that in a still image region where the degree of complexity (activity) is particularly high, due to the influence of noise existing on the image, a difference of strength of the de-block filter or direction of intra-prediction occurs at the boundary of GOPs (Groups Of Pictures) and ends up being viewed as GOP unit flicker (flicker in unit of GOP) in the image quality by a user.

In order to overcome the problem of the related art explained above, it has been desired to provide a coding device, a coding method and a program, able to suppress flicker in unit of a GOP.

Technical Solution

In order to overcome the problem of the related art explained above, a coding device of the present invention has a judgment unit configured to judge whether or not a GOP is a GOP where GOP unit flicker is readily visible in an image decoded after encoding the GOP for each of GOPs forming image data to be coded, and a coding unit configured to apply processing for suppressing the GOP unit flicker when the judgment unit judges that the GOP is a GOP where flicker is readily visible, and encoding the GOP.

Further, a coding device of the present invention has a judging means for judging whether or not a GOP is a GOP where GOP unit flicker is readily visible in an image decoded after encoding the GOP for each of GOPs forming image data to be coded, and a coding means for applying processing for suppressing the GOP unit flicker when the judging means judges that the GOP is a GOP where flicker is readily visible, and encoding the GOP.

A coding method of a second aspect of the invention includes a judging step of judging whether or not a GOP is a GOP where GOP unit flicker is readily visible in an image decoded after encoding the GOP for each of GOPs forming image data to be coded, and a coding step of applying processing for suppressing the GOP unit flicker when the judging step judges that the GOP is a GOP where flicker is readily visible, and encoding the GOP.

A program of a third aspect of the invention is a program executed by a computer performing encoding processing, making the computer execute the following routines: a judgment routine of judging whether or not a GOP is a GOP where GOP unit flicker is readily visible in an image decoded after encoded the GOP for each of GOPs forming image data to be coded, and a coding routine of applying processing for suppressing the GOP unit flicker when it is judged in the judgment routine that the GOP is a GOP where flicker is readily visible, and encoding the GOP.

ADVANTAGEOUS EFFECTS

According to the present invention, a coding device, a coding method and a program, able to suppress GOP unit flicker, can be provided.

EXPLANATION OF REFERENCES 2, 2a ... coding device, 10, 10a ... GOP control circuits, 22 ... A/D conversion circuit, 23 ... picture rearrangement circuit, 24 . . . processing circuit, 25 . . . orthogonal transform circuit, 26 . . . quantization circuit, 27 . . . reversible coding circuit, 28 . . . buffer, 29 . . . inverse quantization circuit, 30 . . . inverse orthogonal transform circuit, 31 . . . re-composing circuit, 32 . . . de-block filter, 33 . . . memory, 41 . . . intra-prediction circuit, 42 . . . motion prediction and compensation circuit, 44 . . . selection circuit, 46 . . . rate control circuit, 71 . . . GOP flicker judgment unit, and 72 . . . GOP control unit.

BEST MODE FOR CARRYING OUT THE INVENTION

<First Embodiment>

Below, a first embodiment of the present invention will be explained.

First, the correspondence between components of the present embodiment and components of the present invention will be explained.

Figure 2:
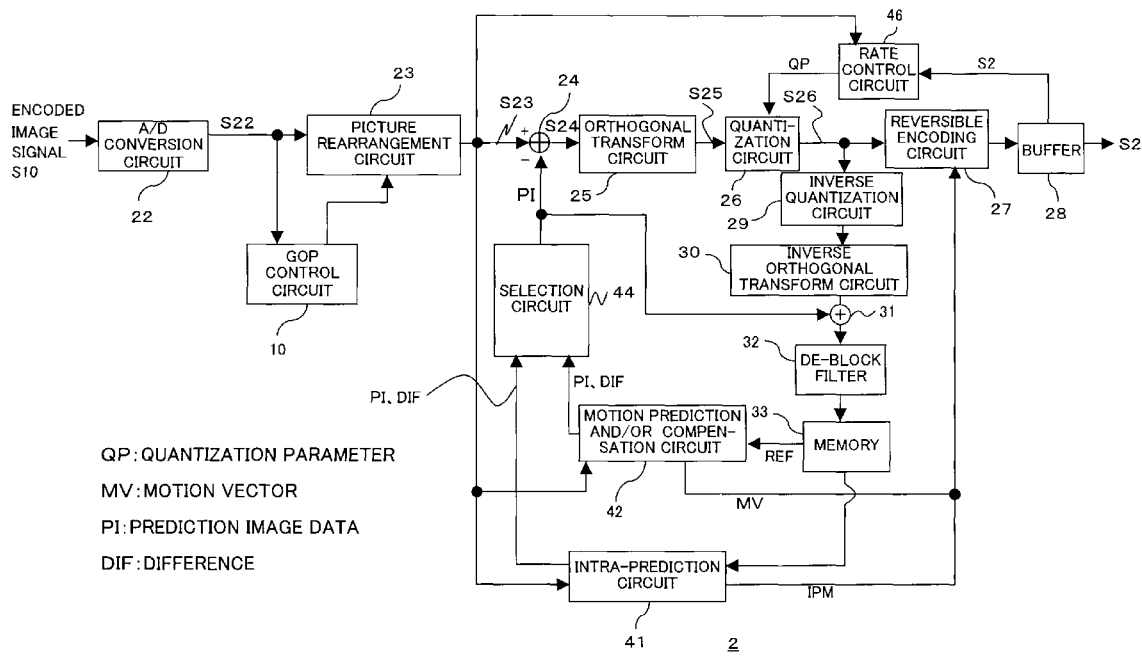
FIG. 2 is a view of the configuration of a coding circuit shown in FIG. 1.
Figure 9:
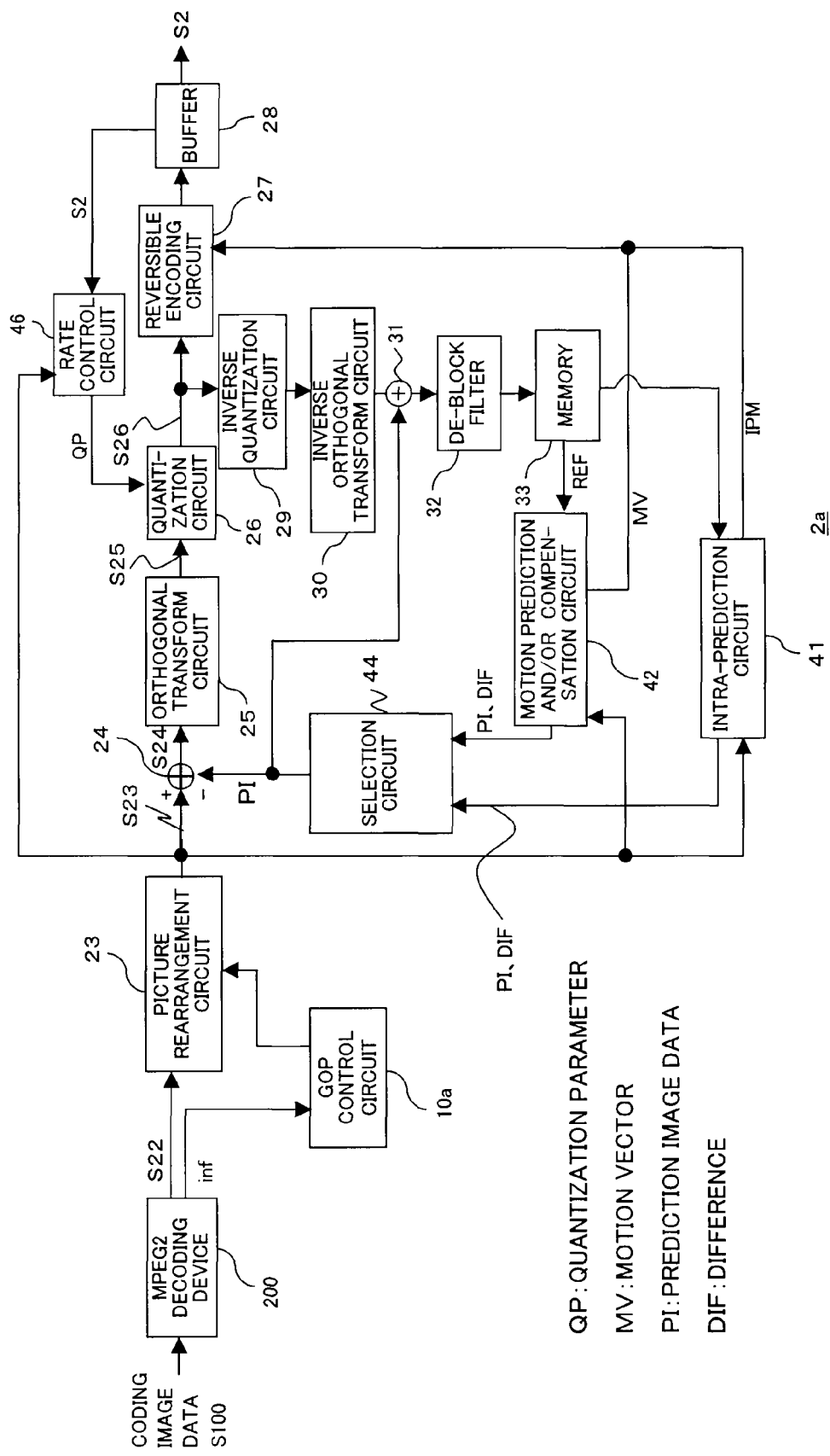
FIG. 9 is a view of the configuration of a coding device of a second embodiment of the present invention.
Figure 10A:
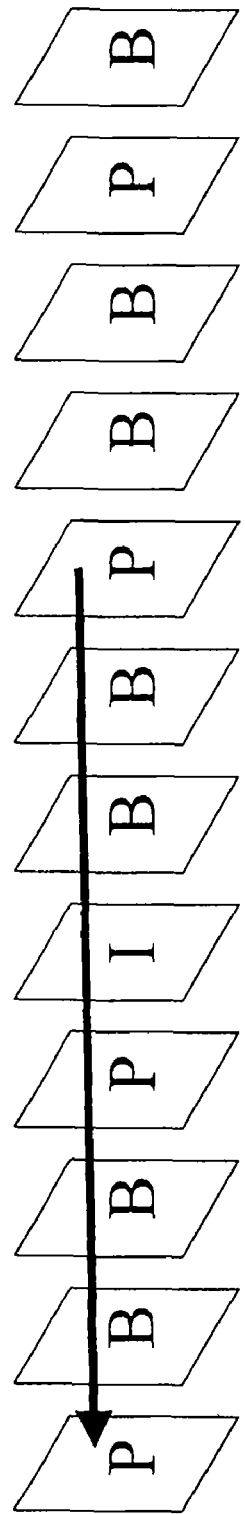
FIG. 10 is a diagram for explaining a problem of the prior art.
Figure 10B:
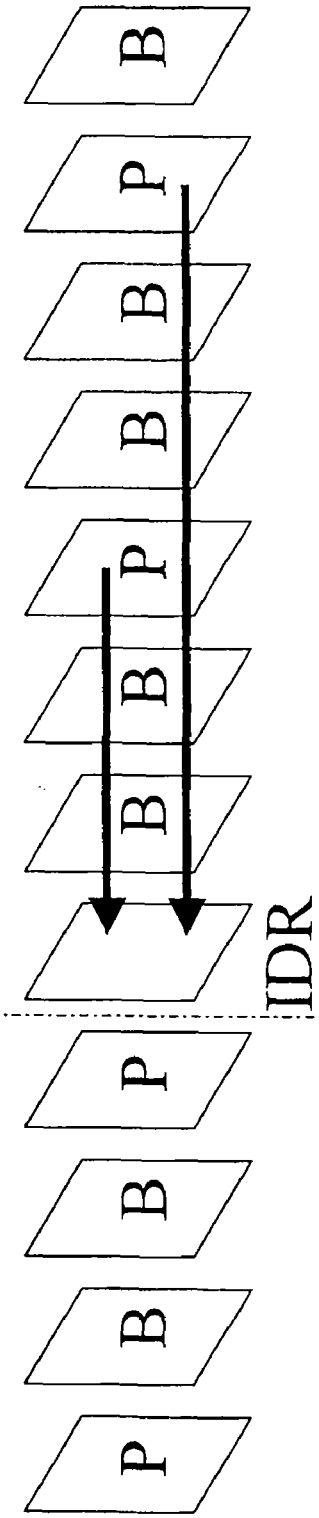

A GOP flicker judgment units 71 of a GOP control circuits 10 and 10a shown in FIG. 2 and FIG. 9 are examples of a judging means of the present invention. Further, a GOP control units 72, a motion prediction and compensation circuits 42, a selection circuits 44, and a rate control circuits 46 of the GOP control circuits 10 and 10a, are examples of a coding means of the present invention.

Figure 1:
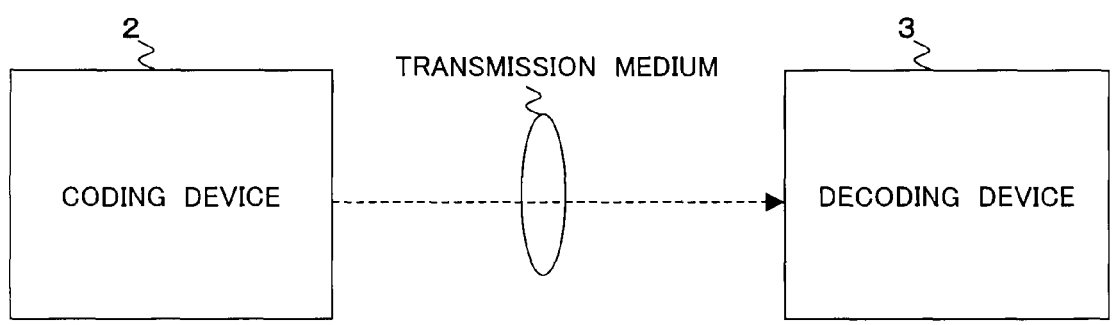
FIG. 1 is a view of the overall configuration of a communication system of a first embodiment of the present invention.

FIG. 1 is a conceptual diagram of a communication system 1 of the present embodiment.

As shown in FIG. 1, the communication system 1 has a coding device 2 provided at a transmission side and a decoding device 3 provided at a reception side.

In the communication system 1, the coding device 2 at the transmission side generates a frame image data (bit stream) compressed by a discrete cosine transform, Karhunen-Loewe transform, or other orthogonal transform and motion compensation, modulates the frame image data, then transmits the modulated frame image data via a satellite broadcast signal, a cable TV network, a telephone line network, a mobile phone network, or other transmission medium.

At the reception side, after the received image signal is demodulated, an expanded frame image data is generated by the inverse transform to the orthogonal transform at the time of the modulation described above and the motion compensation, and the generated data is used.

Note that the transmission medium may be an optical disc, a magnetic disc, a semiconductor memory, or other storage media.

The decoding device 3 shown in FIG. 1 performs decoding corresponding to the encoding of the coding device 2.

Below, the coding device 2 shown in FIG. 1 will be explained.

FIG. 2 is a view of the overall configuration of the coding device 2 shown in FIG. 1.

As shown in FIG. 2, the coding device 2 has, for example, the GOP control circuit 10, an A/D conversion circuit 22, a picture rearrangement circuit 23, a processing circuit 24, an orthogonal transform circuit 25, a quantization circuit 26, a reversible coding circuit 27, a buffer 28, an inverse quantization circuit 29, an inverse orthogonal transform circuit 30, a re-composing circuit 31, a de-block filter 32, a memory 33, an intra-prediction circuit 41, the motion prediction and compensation circuit 42, the selection circuit 44, and the rate control circuit 46.

The coding device 2 is characterized in that the GOP control circuit 10 performs processing for suppressing GOP unit flicker such as a change of a closed GOP to an open GOP when judging that the GOP to be coded (to be judged) is a GOP where the GOP unit flicker (flicker in unit of a GOP) is readily visible.

The coding device 2 performs encoding of the H.264/AVC scheme and inserts an IDR picture at constant intervals.

All or part of the components (circuits etc.) of the coding device 2 shown in FIG. 2 may be realized by a CPU or other processing circuit executing a program.

Below, components of the coding device 2 will be explained.

[GOP Control Circuit 10]

Figure 3:
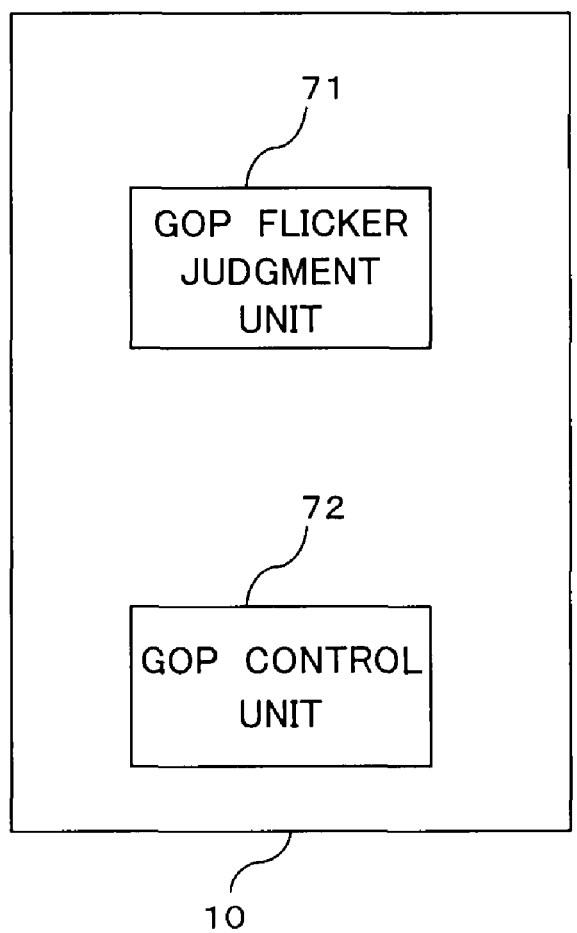
FIG. 3 is a functional block diagram of a GOP control circuit shown in FIG. 2.

FIG. 3 is a view of the configuration of the GOP control circuit 10 shown in FIG. 1.

As shown in FIG. 3, the GOP control circuit 10 has, for example, the GOP flicker judgment unit 71 and the GOP control unit 72.

Figure 4:
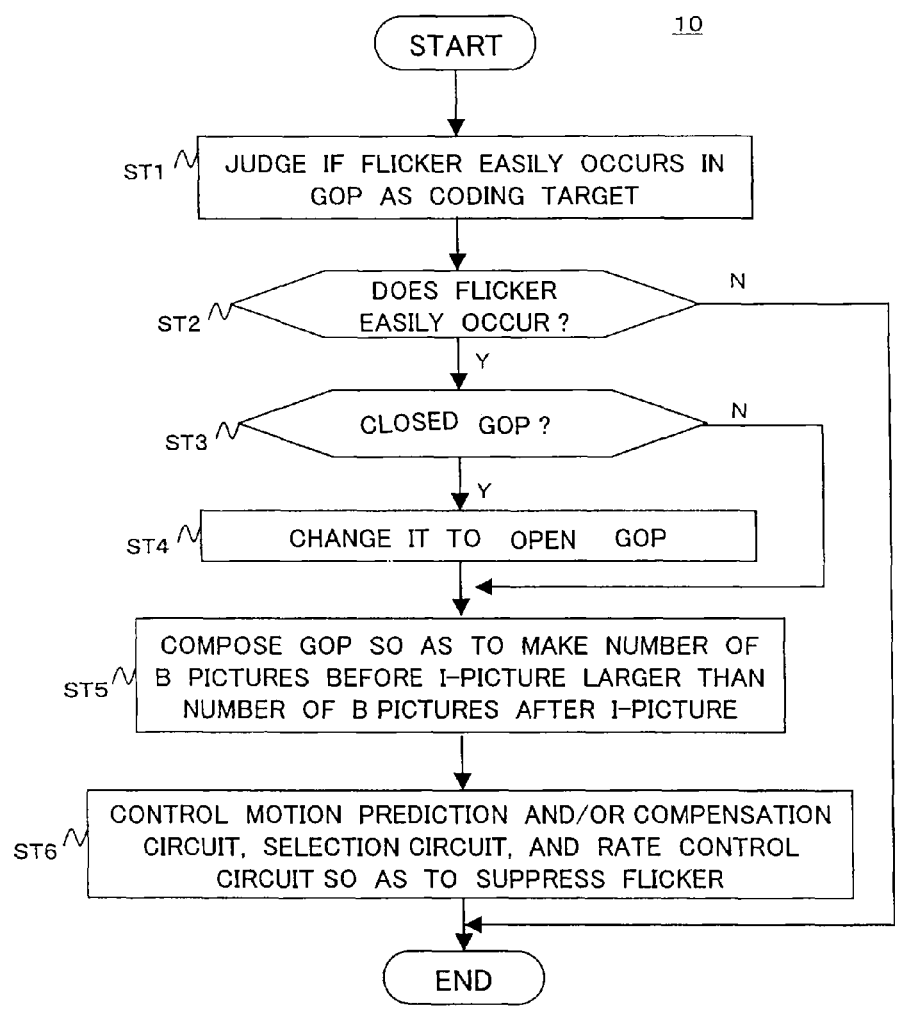
FIG. 4 is a flow chart for explaining processing of the GOP control circuit shown in FIG. 3.

FIG. 4 is a flow chart for explaining an example of the processing of the GOP control circuit 10 shown in FIG. 3.

First, the GOP flicker judgment unit 71 will be explained.

The GOP flicker judgment unit 71 judges whether or not GOP unit flicker is readily visible in an image decoded after encoded a GOP by, for example, judging each GOP to be coded of image data S22 for re-arrangement in the picture rearrangement circuit 23 (step ST1).

At this time, the GOP flicker judgment unit 71, for example, judges that the GOP is a GOP where the flicker is readily visible when the GOP to be judged is a GOP immediately after a scene change.

Further, the GOP flicker judgment unit 71 may perform the above judgment based on a degree of complexity of the pictures forming the GOP located before the GOP to be judged.

At this time, the GOP flicker judgment unit 71 uses, for example, activity data calculated by a technique prescribed in TM (Test Mode) 5 of MPEG as the degree of complexity.

Specifically, the GOP flicker judgment unit 71 calculates the activity data as follows.

The GOP flicker judgment unit 71 calculates the square sum of the difference between the pixel data of each pixel and a mean value thereof, indicated by the following Equation (1), that is, data var_sblk, for each of four sub blocks, each consisting of 8 pixels ×8 lines obtained by dividing a luminance component of a macro block consisting of 16 pixels ×16 lines of the frame image in the image data S2. Here, the value of the data var_sblk becomes larger as the image of the sub block becomes more complex.

[Equation 1]

$$\text{var\_sblk} = \frac{1}{64}\underset{k=1}{\overset{64}{\text{sum}}}(P_k - \text{P\_mean})^2 \qquad (1)$$

Note that the mean value P_mean of the pixel data of the above Equation (1) is calculated according to the following Equation (2).

[Equation 2]

$$\text{P\_mean} = \frac{1}{64}\underset{k=1}{\overset{64}{\text{sum}}} I'_k \qquad (2)$$

Then, the GOP flicker judgment unit 71 finds the data actj by using the minimum value of the data var_sblk calculated for the four sub blocks as indicated by the following Equation (3):

[Equation 3]

$$act_j = 1 + \min_{sblk=1,4}(\text{var\_sblk}) \quad (3)$$

Next, the GOP flicker judgment unit 71, as indicated by the following Equation (4), normalizes the data actj by using the data actj and the average value data avg_act of the data actj obtained for the previous frame image, and calculates the activity data N_actj.

[Equation 4]

$$N\_act_j = \frac{2*act_j + \text{avg\_act}}{act_j + 2*\text{avg\_act}} \quad (4)$$

The GOP flicker judgment unit 71 judges that the flicker is readily visible when there is a sub block in which the above-explained activity data N_actj is equal or exceeds a predetermined threshold value, or there is a sub block in which the number of the activity data is equal or exceeds a predetermined number. Namely, even in a case where the GOP to be judged does not exist immediately after a scene change, the GOP unit flicker will not become a problem when there is no still image region where the activity of the texture is high in the GOP before the target GOP.

Next, the GOP control unit 72 will be explained.

The GOP control unit 72 performs the processing shown below when the GOP flicker judgment unit 71 judges that the GOP to be judged is a GOP where GOP unit flicker is readily visible (step ST2).

Namely, the GOP control unit 72 judges whether or not the GOP to be coded is a closed GOP (step ST3). When judging the GOP as a closed GOP, the GOP control unit changes the GOP to an open GOP (step ST4). Due to this, even if there is an IDR picture, encoding of pictures after the IDR picture is permitted with reference to pictures before the IDR picture.

Figure 5:
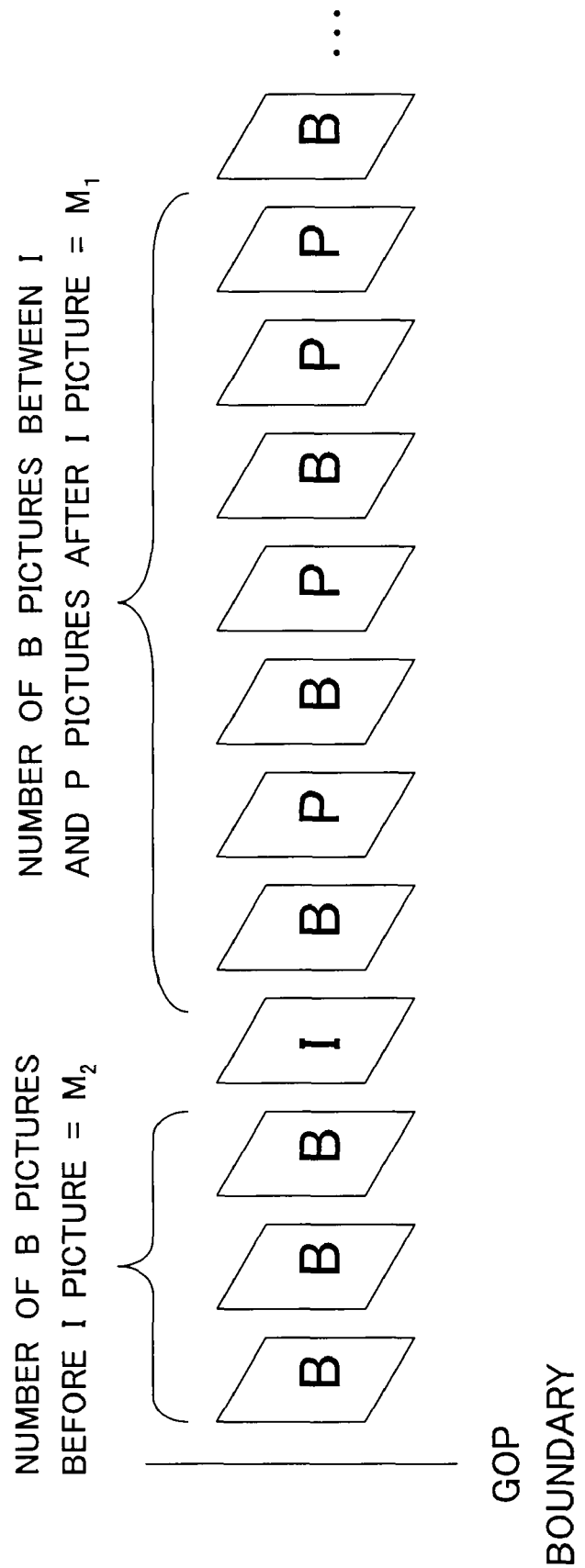
FIG. 5 is a diagram for explaining processing of the GOP control circuit shown in FIG. 3.

Further, when the GOP to be coded is an open GOP, as shown in FIG. 5, the GOP control unit 72 controls the picture rearrangement circuit 23 so as to make the number M2 of B pictures before an I picture larger than the number M1 of the B pictures between the I picture and P picture after the I picture (step ST5). In the example shown in FIG. 5, M2=3 and M1=1.

Further, when the GOP flicker judgment unit 71 judges that the GOP unit flicker is readily visible in the GOP to be judged, as shown below, the GOP control unit 72 controls the intra-prediction circuit 41, the selection circuit 44, and the rate control circuit 46 (step ST6).

[A/D Conversion Circuit 22]

The A/D conversion circuit 22 converts encoded image data S10 consisting of the input analog luminance signal Y and color difference signals Pb and Pr to the digital image data S22 and outputs the converted data to the picture rearrangement circuit 23.

[Picture Rearrangement Circuit 23]

The picture rearrangement circuit 23 rearranges the image data S22 input from the A/D conversion circuit 22 to a rearranged image data S23 which is rearranged in an encoding sequence in accordance with a GOP (Group Of Pictures) structure consisting of the picture types I, P, and B and outputs the resultant image data S23 to the processing circuit 24, the intra-prediction circuit 41, the motion prediction and compensation circuit 42, and the rate control circuit 46.

[Processing Circuit 24]

The processing circuit 24 generates an image data S24 indicating a difference between the image data S23 and prediction image data PI input from the selection circuit 44 and outputs the generated data to the orthogonal transform circuit 25.

[Orthogonal Transform Circuit 25]

The orthogonal transform circuit 25 applies a discrete cosine transform, Karhunen-Loewe transform, or other orthogonal transform to the image data S24 to generate an image data (for example, DCT coefficient) S25 and outputs the result to the quantization circuit 26.

[Quantization Circuit 26]

The quantization circuit 26 quantizes the image data S25 with a quantization scale (quantization step) defined in accordance with a quantization parameter QP based on a quantization parameter QP input from the rate control circuit 46 to generate an image data S26 and outputs the generated image data to the reversible coding circuit 27 and the inverse quantization circuit 29.

[Reversible Coding Circuit 27]

The reversible coding circuit 27 stores an image data obtained by applying a variable length coding or an arithmetic coding to the image data S26, in the buffer 28.

At this time, the reversible coding circuit 27 encodes a motion vector MV input from the motion prediction and compensation circuit 42 when a selection data S44 indicates the selection of inter-prediction coding and stores the encoded result in a header data.

Further, the reversible coding circuit 27 stores an intra-prediction mode IPM input from the intra-prediction circuit 41 in the header data etc. when the selection data S44 indicates the selection of intra-prediction coding.

Further, the reversible coding circuit 27 includes the quantization scale used in the quantization in the quantization circuit 26, in each macro block MB.

The image data stored in the buffer 28 is modulated etc., and then transmitted.

[Inverse Quantization Circuit 29]

The inverse quantization circuit 29 inversely quantizes the image data S26 based on the quantization scale used in the quantization circuit 26 and outputs the quantized result to the inverse orthogonal transform circuit 30.

[Inverse Orthogonal Transform Circuit 30]

The inverse orthogonal transform circuit 30 applies an inverse orthogonal transform corresponding to the orthogonal transform of the orthogonal transform circuit 25 to the inverse quantized image data input from the inverse quantization circuit 29 and outputs the transformed result to the re-composing circuit 31.

[Re-Composing Circuit 31]

The re-composing circuit 31 adds a prediction image data PI input from the selection circuit 44 and the image data input from the inverse orthogonal transform circuit 30 to generate a re-composed image data and outputs the result to the de-block filter 32.

[De-Block Filter 32]

The de-block filter 32 eliminates block distortion of the image data input from the re-composing circuit 31, and then writes the result into the memory 33 as the reference image data.

[Intra-Prediction Circuit 41]

The intra-prediction circuit 41 applies intra-prediction coding to each macro block MB including the image data read out from the memory 33, based on each of the previously defined intra-prediction modes, to generate a predicted image, and detects a difference DIF between the prediction image data and the image data S23.

Then, the intra-prediction circuit 41 specifies the intra-prediction mode corresponding to the minimum difference among the above-described differences generated for the plurality of intra-prediction modes, and outputs the specified intra-prediction mode IPM to the reversible coding circuit 27.

Further, the intra-prediction circuit 41 outputs the prediction image data PI according to the above specified intra-prediction mode and the above difference DIF, to the selection circuit 44.

[Motion Prediction and Compensation Circuit 42]

The motion prediction and compensation circuit 42 performs motion prediction processing using a frame data and a field data as units in units of blocks in the image data S23, and determines the motion vector MV based on the reference image data REF read out from the memory 33.

Namely, the motion prediction and compensation circuit 42 determines the motion vector MV minimizing the difference DIF between the prediction image data PI which is defined according to the motion vector MV and the reference image data REF for each block, and the image data S23.

The motion prediction and compensation circuit 42 outputs the prediction image data PI and the difference DIF to the selection circuit 44, and outputs the motion vector MV to the reversible coding circuit 27.

The motion prediction and compensation circuit 42, where the block as the processing target is included in a B slice, performs a judgment of which of a forward directional prediction, a backward directional prediction, and a bi-directional prediction is to be performed.

Figure 6:
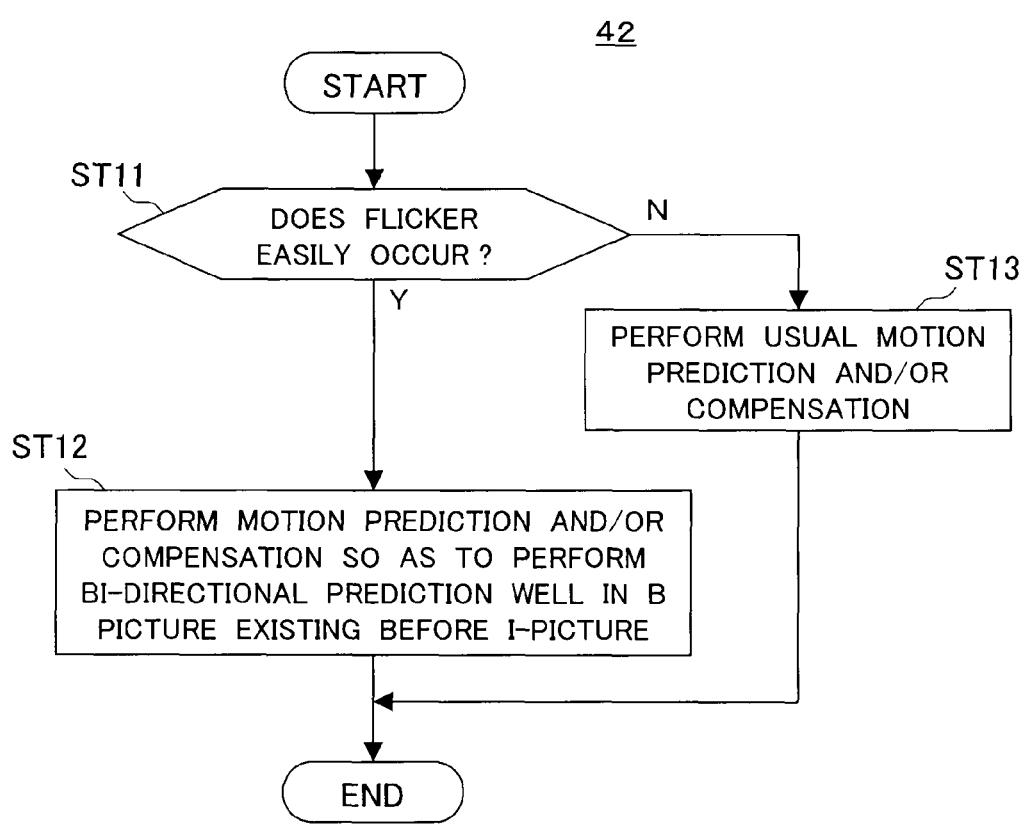
FIG. 6 is a flow chart for explaining processing of a motion prediction and compensation circuit shown in FIG. 2.

At this time, when the GOP control unit 72 judges that the GOP to be judged is a GOP where GOP unit flicker is readily visible (step ST11), the motion prediction and compensation circuit 42, as shown in FIG. 6, performs processing giving priority to the bi-directional prediction for the B picture existing before the I picture in the GOP to be processed based on the control from the GOP control unit 72 (step ST12). In cases other than this, the motion prediction and compensation circuit 42 performs the usual motion prediction and compensation processing (step ST13).

Specifically, the motion prediction and compensation circuit 42 computes a coding cost (for example, the above difference DIF) for each of the forward directional prediction, backward directional prediction, and bi-directional prediction, and selects the prediction method with which the coding cost becomes the minimum. At this time, by giving an offset of a negative value to the coding cost of the bi-directional prediction, the selection of bi-directional prediction is facilitated.

The motion prediction and compensation circuit 42 judges whether or not the image quality at the time of the decoding will be remarkably deteriorated by performing the bi-directional prediction for a reason that the image data S23 is occluded etc., and does not give the above offset when judging that the image quality will be remarkably deteriorated.

Specifically, the motion prediction and compensation circuit 42 does not give the above offset when judging that the coding cost L0_cost in an L0 direction and the coding cost L1_cost in an L1 direction satisfy a relationship of the following Equation (5) with respect to a threshold value identification data Θ determined in advance. Here, in the B pictures, two pictures are selected from among any reference pictures at the maximum. Predictions according to those two will be called as L0 and L1 predictions. The coding costs L0_cost and L1_cost in the L0 and L1 directions indicate the respective coding costs of the L0 and L1 predictions.

[Equation 5]

$$|L0\_cost - L1\_cost| > \Theta \qquad (5)$$

[Selection Circuit 44]

The selection circuit 44 compares the difference DIF input from the intra-prediction circuit 41 and the difference DIF input from the motion prediction and compensation circuit 42.

When judging that the difference DIF input from the intra-prediction circuit 41 is smaller according to the above comparison, the selection circuit 44 selects the prediction image data PI input from the intra-prediction circuit 41 and outputs the selected data to the processing circuit 24.

When judging that the difference DIF input from the motion prediction and compensation circuit 42 is smaller according to the above comparison, the selection circuit 44 selects the prediction image data PI input from the motion prediction and compensation circuit 42 and outputs the selected data to the processing circuit 24.

Further, when selecting the prediction image data PI from the intra-prediction circuit 41, the selection circuit 44 outputs the selection data S44 indicating the selection of the inter-prediction coding to the reversible coding circuit 27 and, when selecting the prediction image data PI from the motion prediction and compensation circuit 42, outputs the selection data S44 indicating the selection of the intra-prediction coding to the reversible coding circuit 27.

Figure 7:
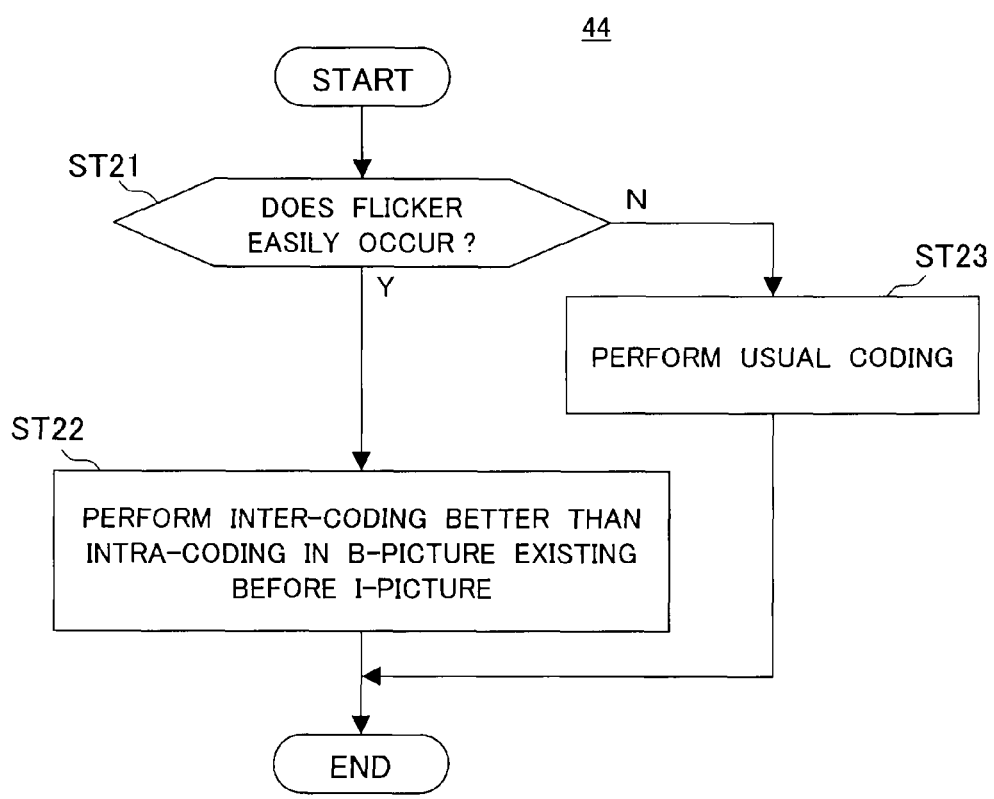
FIG. 7 is a flow chart for explaining processing of a selection circuit shown in FIG. 2.

The selection circuit 44, as shown in FIG. 7, performs the following processing based on the control from the GOP control unit 72 when the GOP control unit 72 judges that the GOP to be judged is a GOP where a GOP unit flicker is readily visible (step ST21).

Namely, in the case where the block to be processed is included in the inter-slice, the selection circuit 44 performs judgment of which of the prediction image data PI input from the intra-prediction circuit 41 and the prediction image data PI input from the motion prediction and compensation circuit 42 is to be selected (whether the intra-macro block is to be selected or the inter-macro block is to be selected). At that time, it gives priority to the inter-macro blocks for the B picture existing before the I picture in that GOP (step ST22). This is realized by performing, for example, in the selection circuit 44, adding an offset having a negative value to the difference DIF (coding cost) from the motion prediction and compensation circuit 42, and thereafter, comparing the difference DIF added the offset and the difference DIF from the intra-prediction circuit 41.

When the GOP control unit 72 judges that the GOP to be judged is a GOP where the GOP unit flicker is readily visible, the selection circuit 44 performs the usual selection without any particular preference (step ST23).

[Rate Control Circuit 46]

The rate control circuit 46 determines the quantization parameter QP based on the image data read out from the buffer 28 and outputs this to the quantization circuit 26.

Figure 8:
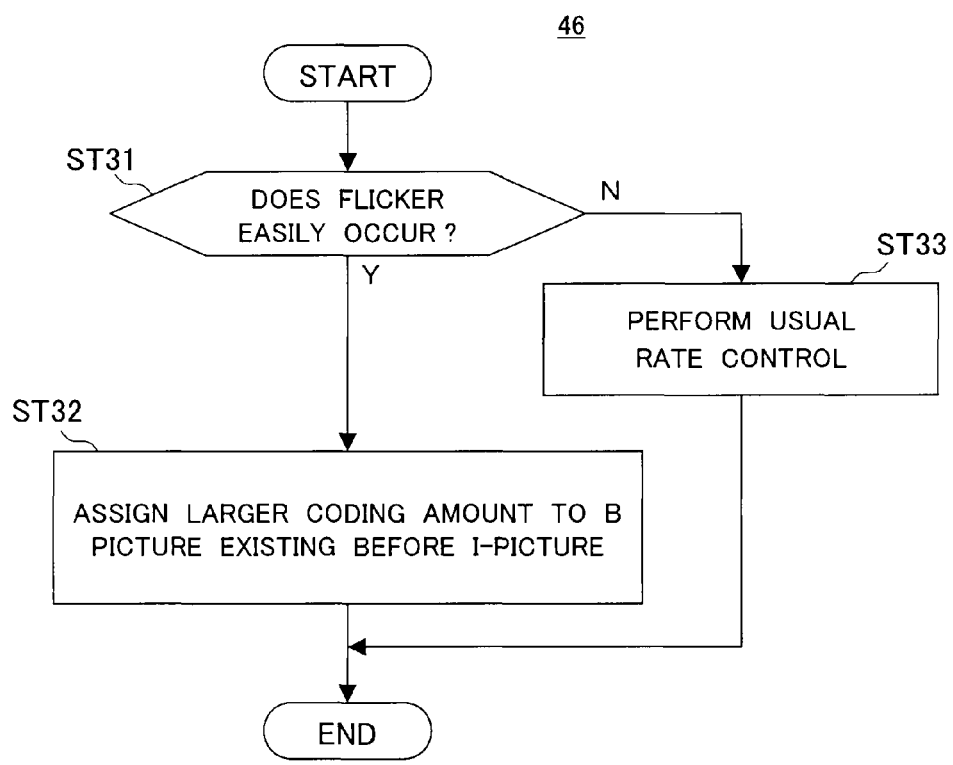
FIG. 8 is a flow chart for explaining processing of a rate control circuit shown in FIG. 2.

When the GOP control unit 72 judges that the GOP to be judged is a GOP where the GOP unit flicker is readily visible, the rate control circuit 46, as shown in FIG. 8, determines the quantization parameter QP so as to assign a larger coding amount than that for a usual B picture to the B picture existing before the I picture based on the control from the GOP control unit 72 (step ST32). In cases other than this, the rate control circuit 46 assigns the usual coding amount without particular preference.

Below, an example of the overall operation of the coding device 2 shown in FIG. 2 will be explained.

The GOP control circuit 10 in the coding device 2 judges whether or not the GOP to be coded (to be judged) in the image data S22 input from the A/D conversion circuit 22 is a GOP where GOP unit flicker is readily visible.

Then, when the GOP control circuit 10 judges that flicker is readily visible, the picture rearrangement circuit 23 is made to perform processing for suppressing the GOP unit flicker such as the change of a closed GOP to an open GOP.

Then, the processing circuit 24 generates image data S24 indicating the difference between the image data S23 and the prediction image data PI input from the selection circuit 44 and outputs the generated data to the orthogonal transform circuit 25.

Then, the difference is orthogonally transformed at the orthogonal transform circuit 25, and quantized at the quantization circuit 26. Further, the quantized image is inversely quantized at the inverse quantization circuit 29, is inversely orthogonally transformed at the inverse orthogonal transform circuit 30, and re-composed at the re-composing circuit 31.

The reference image data obtained by the re-composing at the re-composing circuit 31 is written into the memory 33.

Further, the intra-prediction circuit 41 performs the intra-prediction, then the prediction image data PI and the difference DIF are output to the selection circuit 44.

Further, the motion prediction and compensation circuit 42 performs the motion prediction and compensation processing whereupon the motion vector MV is specified and the prediction image data PI and the difference DIF are output to the selection circuit 44.

Here, the motion prediction and compensation circuit 42 computes the coding cost (for example, the above difference DIF) for each of the forward directional prediction, backward directional prediction, and bi-directional prediction, and selects the prediction method giving the minimum coding cost. At this time, when it is judged that flicker is readily visible, the motion prediction and compensation circuit 42 gives an offset of a negative value to the coding cost of the bi-directional prediction to thereby facilitate the selection of the bi-directional prediction.

Then, the selection circuit 44 outputs the prediction image data PI corresponding to the smaller difference DIF between the difference DIF input from the intra-prediction circuit 41 and the difference DIF input from the motion prediction and compensation circuit 58 to the processing circuit 24.

Here, the selection circuit 44 gives priority to an inter-macro block for a B picture existing before an I picture in a case where the GOP control unit 72 judges that the GOP to be judged is a GOP where the GOP unit flicker is readily visible.

As explained above, according to the coding device 2, when the GOP to be judged is a GOP where the GOP unit flicker is readily visible, discontinuity of images between GOPs is avoided, and the GOP unit flicker can be suppressed.

Due to this, in the coding device of the AVC scheme outputting image compression information of a GOP structure inserting a random accessible picture (IDR picture) at constant time intervals, the GOP unit flicker can be suppressed.

<Second Embodiment>

FIG. 9 is a view of the configuration of a coding device 2a of a second embodiment of the present invention.

As shown in FIG. 9, in the coding device 2a, in comparison with the coding device 2 shown in FIG. 1, an MPEG2 decoding device 200 is provided in place of the A/D conversion circuit 22, and it is judged in a GOP control circuit 10a whether or not GOP unit flicker is readily visible in the GOP to be judged by using the decoding information of the MPEG2 decoding device 200. Configurations of the coding device 2a other than that are the same as those of the coding device 2 of the first embodiment.

Below, the MPEG2 decoding device 200 and the GOP control circuit 10a will be explained.

The MPEG2 decoding device 200 inputs a coding image data S100 of, such as, the MPEG2 scheme or the like, decodes the input data to an image data S22, and outputs the resultant data to the picture rearrangement circuit 23.

Further, the MPEG2 decoding device 200 outputs the orthogonal transform (DCT) coefficient included in the coding image data S100 and the motion vector or other coding attribute information inf, to the GOP control circuit 10a.

The GOP control circuit 10a, based on the coding attribute information inf, detects if a region is a still image region including texture, that is, if the motion vector information is "0" and includes an orthogonal transform coefficient which is not 0, to judge whether or not GOP unit flicker is readily visible in the GOP to be judged.

According to the present embodiment, by effectively utilizing the information obtained by the MPEG2 decoding device 200, it can be judged whether or not GOP unit flicker is readily visible.

The present invention is not limited to the above embodiments.

In the above embodiments, cases where the coding devices 2, 102, and 202 perform coding by the H.264/AVC were described, but the present invention can be applied to other coding schemes in which a GOP and an IDR are prescribed.

The invention claimed is:

1. A coding device comprising:
   a judgment unit configured to judge whether a Group of Pictures (GOP) from a plurality of GOPs forming an image is a GOP where GOP unit flicker is readily visible for each GOP included in the plurality of GOPs; and
   a coding unit configured to apply processing for suppressing the GOP unit flicker when the judgment unit judges that the GOP is the GOP where the flicker is readily visible, and encode the processed GOP, wherein
   the coding unit changes the GOP to be judged to an open GOP upon determination that the judgment unit judges that the GOP to be judged is the GOP where flicker is readily visible and the GOP to be judged is a closed GOP, and
   the coding unit codes the changed GOP.

2. The coding device according to claim 1, wherein:
   the judgment unit judges a GOP immediately after a scene change as the GOP where flicker is readily visible.

3. The coding device as set forth in claim 1, wherein:
   the judgment unit judges whether the GOP to be judged is the GOP where flicker is readily visible based on a degree of complexity of pictures forming the GOP located before the GOP to be judged.

4. The coding device as set forth in claim 1, further comprising:
   a generation unit configured to decode the coded image data and generate image data included in the image before coding by the coding unit, and
   wherein the judgment unit judges whether the GOP is the GOP where flicker is readily visible based on the generated image data.

5. The coding device as set forth in claim 4, wherein:
   the judgment unit performs the judgment based on an orthogonal transform coefficient included in the generated image data.

6. The coding device as set forth in claim 1, wherein:
the coding unit composes a GOP to make the number of the B pictures before the I picture in an open GOP to be judged larger in comparison with the number of B pictures existing between the I picture and the P picture after the I picture in the open GOP to be judged upon determination that the judgment unit judges that the GOP to be judged is the GOP where the flicker is readily visible and the GOP to be judged is an open GOP, and the coding unit codes the composed GOP.

7. The coding device as set forth in claim 1, wherein:
the coding unit performs control so that bi-directional prediction coding is selected as the encoding of the B picture located before the I picture in the GOP to be judged upon determination that the judgment unit judges the GOP to be judged is the GOP where flicker is readily visible in comparison with when the GOP flicker is not readily visible.

8. The coding device as set forth in claim 1, wherein:
the coding unit performs control so that inter-coding is selected as the encoding of the B picture located before an I picture in the GOP to be judged upon determination that the judgment unit judges the GOP is the GOP where flicker is readily visible in comparison with when the GOP flicker is not readily visible.

9. The coding device as set forth in claim 1, wherein the coding unit
selects a prediction method according to a minimum coding cost among forward directional prediction, backward directional prediction, and bi-directional prediction in motion prediction and compensation,
encodes a block of each picture, and
upon determination that the judgment unit judges the GOP is the GOP where flicker is readily visible, performs the selection by lowering the coding cost of the bi-directional prediction in comparison with when the GOP flicker is not readily visible when encoding the B picture located before the I picture in the GOP to be judged.

10. The coding device as set forth in claim 1, wherein:
the coding unit
selects and encodes a block for encoding according to one of inter-coding and intra-coding having a smaller coding cost, and
upon determination that the judgment unit judges the GOP is the GOP where flicker is readily visible, performs the selection by lowering the coding cost of the inter-coding when encoding of the B picture located before the I picture in the GOP in comparison with when the GOP flicker is not readily visible.

11. The coding device as set forth in claim 1, wherein:
the coding unit quantizes a block of each picture and encodes the quantized block, and
the coding unit performs the quantization to assign a larger coding amount upon determination that the judgment unit judges the GOP is the GOP where flicker is readily visible than the coding amount in the readily invisible case when encoding the B picture located before the I picture in the GOP.

12. The coding device as set forth in claim 1, wherein:
the GOP to be judged includes a picture located before a predetermined picture.

13. A coding method comprising:
a judging step of judging whether a Group of Pictures (GOP) from a plurality of GOPs forming an image is a GOP where GOP unit flicker is readily visible for each GOP included in the plurality of GOPs; and
a coding step of applying processing for suppressing the GOP unit flicker when the judging step judges that the GOP is the GOP where flicker is readily visible;
and encoding the processed GOP, wherein
the coding unit changes the GOP to be judged to an open GOP upon determination that the judgment unit judges that the GOP to be judged is the GOP where flicker is readily visible and the GOP to be judged is a closed GOP, and
the coding unit codes the changed GOP.

14. A coding device comprising:
a judging means for judging whether a Group of Pictures (GOP) from a plurality of GOPs forming an image is a GOP where GOP unit flicker is readily visible for each GOP included in the plurality of GOPs; and
a coding means for applying processing for suppressing the GOP unit flicker when the judging means judges that the GOP is the GOP where flicker is readily visible, and encoding the processed GOP, wherein
the coding unit changes the GOP to be judged to an open GOP upon determination that the judgment unit judges that the GOP to be judged is the GOP where flicker is readily visible and the GOP to be judged is a closed GOP, and
the coding unit codes the changed GOP.

15. The coding device as set forth in claim 14, wherein:
the judgment means judges whether the GOP to be judged is the GOP where flicker is readily visible based on a degree of complexity of pictures forming the GOP located before the GOP to be judged.

16. The coding device as set forth in claim 14, further comprising:
a generating means for generating image data forming the image before coding by the coding means, and
wherein the judging means judges whether the GOP is the GOP where flicker is readily visible based on the generated image data.

17. A non-transitory computer readable storage medium having executable instructions stored therein which when executed by a processor in a coding device causes the processor to execute a method comprising:
judging whether a Group of Pictures (GOP) from a plurality of GOPs forming an image is a GOP where GOP unit flicker is readily visible for each GOP included in the plurality of GOPs, and
applying processing, according to a number of B pictures before an I picture in comparison with a number of B pictures between the I picture and a P picture, for suppressing the GOP unit flicker when it is judged that the GOP is the GOP where flicker is readily visible, wherein
the coding unit changes the GOP to be judged to an open GOP upon determination that the judgment unit judges that the GOP to be judged is the GOP where flicker is readily visible and the GOP to be judged is a closed GOP, and
the coding unit codes the changed GOP.

* * * * *